(12) United States Patent
Song (10) Patent No.: US 10,425,594 B2
(45) Date of Patent: Sep. 24, 2019

(54) VIDEO PROCESSING APPARATUS AND METHOD AND COMPUTER PROGRAM FOR EXECUTING THE VIDEO PROCESSING METHOD

(71) Applicant: TwoEyes Tech, Inc., Anyang-si, Gyeonggi-do (KR)

(72) Inventor: Hun Joo Song, Yongin-si (KR)

(73) Assignee: TwoEyes Tech, Inc., Anyang-si (KR)

( * ) Notice: Subject to any disclaimer, the term of this patent is extended or adjusted under 35 U.S.C. 154(b) by 35 days.

(21) Appl. No.: 15/605,117

(22) Filed: May 25, 2017

(65) Prior Publication Data

US 2018/0332238 A1    Nov. 15, 2018

(30) Foreign Application Priority Data

May 15, 2017    (KR) .................. 10-2017-0059910

(51) Int. Cl.
| | |
|---|---|
| *H04N 5/262* | (2006.01) |
| *H04N 13/296* | (2018.01) |
| *H04N 13/218* | (2018.01) |
| *H04N 13/286* | (2018.01) |

(52) U.S. Cl.
CPC ......... *H04N 5/2625* (2013.01); *H04N 13/218* (2018.05); *H04N 13/286* (2018.05); *H04N 13/296* (2018.05)

(58) Field of Classification Search
CPC .............................. H04N 5/2625; H04N 5/38
See application file for complete search history.

(56) References Cited

U.S. PATENT DOCUMENTS

| | | | | |
|---|---|---|---|---|
| 9,743,012 B2* | 8/2017 | Nakata | ................ | H04N 5/2356 |
| 2008/0049116 A1* | 2/2008 | Tojima | ................... | H04N 5/232 |
| | | | | 348/222.1 |
| 2010/0265340 A1* | 10/2010 | Masuda | ............ | H04N 5/23222 |
| | | | | 348/207.11 |
| 2011/0267481 A1* | 11/2011 | Kagei | ................... | H04N 5/222 |
| | | | | 348/211.9 |
| 2015/0016746 A1* | 1/2015 | Tsubota | ............. | H04N 5/23238 |
| | | | | 382/275 |
| 2016/0080650 A1* | 3/2016 | Okazawa | ........... | H04N 5/23238 |
| | | | | 348/36 |

(Continued)

FOREIGN PATENT DOCUMENTS

| | | |
|---|---|---|
| JP | 2010-136387 A | 6/2010 |
| KR | 10-2011-0091378 A | 8/2011 |
| KR | 10-1675567 B1 | 11/2016 |

*Primary Examiner* — Jason A Flohre
(74) *Attorney, Agent, or Firm* — Novick, Kim & Lee, PLLC; Sang Ho Lee (57) ABSTRACT

Provided are a video processing apparatus and method. The video processing apparatus includes: an imaging device and a processing device connected to the imaging device, wherein the imaging device includes: an image acquisition unit configured to obtain a plurality of frame images; a first transmission unit configured to transmit the plurality of frame images to the processing device; a mode setting unit configured to set, in the imaging device, mode parameters received from the processing device; a combination unit configured to convert the plurality of frame images into a combination image by using the mode parameters; and a second transmission unit configured to transmit the combination image to the processing device.

9 Claims, 6 Drawing Sheets

(56) References Cited

U.S. PATENT DOCUMENTS

2017/0195568 A1\* 7/2017 Leizerovich, Jr. ........................... H04N 5/23238
2017/0289448 A1 10/2017 Song \* cited by examiner

VIDEO PROCESSING APPARATUS AND METHOD AND COMPUTER PROGRAM FOR EXECUTING THE VIDEO PROCESSING METHOD

CROSS-REFERENCE TO RELATED APPLICATION

This application claims the priority of Korean Patent Application No. 10-2017-0059910, filed on May 15, 2017, in the Korean Intellectual Property Office, the disclosure of which is incorporated herein in its entirety by reference.

BACKGROUND

1. Field

One or more embodiments relate to a video processing apparatus and method and a computer program for executing the video processing method.

2. Description of the Related Art

Movable devices provide various additional functions such as camera functions in addition to voice call and wireless Internet services. Mobile devices having camera functions include camera modules for capturing images of subjects and thus, users may capture images as desired anytime and anywhere and may store the captured images in the mobile devices.

SUMMARY

One or more embodiments include an image processing apparatus and method of generating one combination image obtained by combining a plurality of frame images.

One or more embodiments include an image processing apparatus and method of generating one combination image in consideration of mode parameters obtained for frame images.

According to one or more embodiments, a video processing apparatus includes an imaging device and a processing device connected to the imaging device, wherein the imaging device includes: an image acquisition unit configured to obtain a plurality of frame images; a first transmission unit configured to transmit the plurality of frame images to the processing device; a mode setting unit configured to set, in the imaging device, mode parameters received from the processing device; a combination unit configured to convert the plurality of frame images into a combination image by using the mode parameters; and a second transmission unit configured to transmit the combination image to the processing device.

The combination unit may be further configured to generate the plurality of frame images as one combination image in consideration of the mode parameters and detection data obtained by a sensor unit.

The combination unit may be further configured to change the mode parameters according to a mode value received from a user and generate the plurality of frame images as one combination image according to the changed mode parameters.

According to one or more embodiments, a video processing method of a video processing apparatus comprising an imaging device and a processing device connected to the imaging device includes: obtaining a plurality of frame images, wherein the obtaining is performed by the imaging device; transmitting the plurality of frame images to the processing device; setting, in the imaging device, mode parameters received from the processing device; converting the plurality of frame images into one combination image by using the mode parameters; and transmitting the combination image to the processing device.

The converting of the plurality of frame images into the one combination image may include generating the plurality of frame images as the one combination image in consideration of the mode parameters and detection data obtained by a sensor unit.

The converting of the plurality of frame images into the one combination image comprises determining positions of the plurality of frame images by using detection data obtained by a sensor included in the imaging device, locating the plurality of frame images at the positions, and generating the one combination image by combining the plurality of frame images located at the positions.

The converting of the plurality of frame images into the one combination image may include changing the mode parameters according to a mode value received from a user and generating the plurality of frame images as the one combination image according to the changed mode parameters.

According to one or more embodiments, a computer program is stored in a non-transitory computer-readable storage medium to execute the video processing method by using a computer.

In addition, another method and another system for embodying the present disclosure and a non-transitory computer-readable recording medium having embodied thereon a computer program for executing the video processing method are further provided.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

As used herein, the term "and/or" includes any and all combinations of one or more of the associated listed items. Expressions such as "at least one of", when preceding a list of elements, modify the entire list of elements and do not modify the individual elements of the list.

Figure 1:
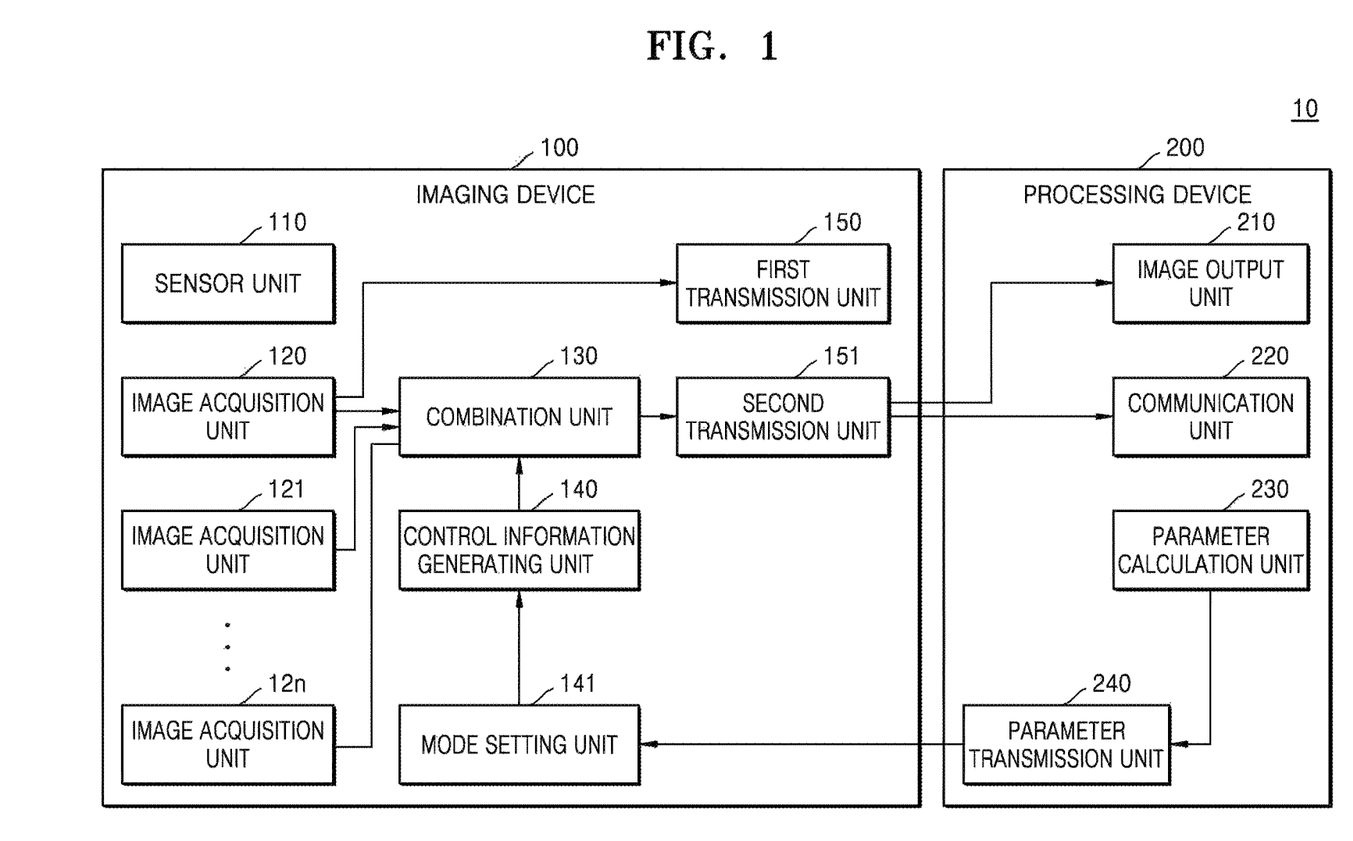
FIG. 1 is a block diagram of a video processing apparatus according to embodiments.

FIG. 1 is a block diagram illustrating a configuration of a video processing apparatus 10 according to embodiments.

The video processing apparatus 10 according to an embodiment includes an imaging device 100 and a processing device 200. The processing device 200 is, for example, a personal computer (PC). The imaging device 100 and the processing device 200 are connected to each other by wire or wirelessly.

The imaging device 100 includes a lens, a sensor for converting an optical image formed on the lens into an electrical signal such as a charge-coupled device (CCD) or a complementary metal-oxide semiconductor (CMOS), an image processing unit for performing various image processing on a frame image such as an image signal processor (ISP), and an interface unit for exchanging a frame image, a generated combination image, other data, and a control signal with the processing device 200.

The processing device 200 includes an I/F Interface for exchanging a frame image, a converted combination image, other data, and a control signal with the imaging device 100, a central processing unit (CPU) for executing various processes, a memory for storing various software and data needed in order for the CPU to perform processing, a frame image, and a combination image, an image output unit 210 for outputting an image signal to a monitor connected to the processing device 200, a communication unit 220 for transmitting an image signal, etc. to another device connected through a network, a control unit for controlling the processing device 200, and a bus for connecting the above units. Examples of the memory include a random-access memory (RAM), a read-only memory (ROM), and a hard disk drive (HDD). The processing device 200 may further include a user manipulation instruction receiving unit.

In the video processing apparatus 10 according to an embodiment, the image processing unit included in the imaging device 100 has a stereoscopic image conversion function and the CPU included in the processing device 200 has a conversion parameter calculation function.

In the imaging device 100, image acquisition units 120, 121, . . . , and 12n generate frame images and transmit the frame images to a combination unit 130 and a first transmission unit 150. The first transmission unit 150 transmits the frame images that are original to the processing device 200. By using mode parameters received from the processing device 220, a mode setting unit 141 sets the mode parameters in the imaging device 100.

In another embodiment, the processing device 200 may add various tags to the received frame images. The processing device 200 may extract objects included in the frame images and features of the objects and may set the objects and the features with tags. The processing device 200 may control the frame images that are original to be output or may process the frame images by using the mode parameters input after image capturing. That is, a combination image corresponding to the frame images may be generated by reflecting the mode parameters.

The combination unit 130 generates the frame images as one combination image based on the set mode parameters. The mode parameters may be changed by a sensor unit 110 included in the imaging device 100. The sensor unit 110 may determine an orientation and a direction of the imaging device 100 by using collected detection data. The sensor unit 110 may determine an orientation and/or a direction of the imaging device 100 by recognizing an operation. The sensor unit 110 may determine an orientation and/or a direction of the imaging device 100 by using directions of detected solid matters or people. The sensor unit 110 may determine an orientation or a direction of the imaging device 100 in consideration of positions of the face and the torso of a person. Examples of the sensor unit 110 may include a gravity sensor, an acceleration sensor, a proximity sensor, and an image sensor. The combination unit 130 determines which units are to be used for acquiring the frame images based on the mode parameters. The combination unit 130 may selectively acquire the frame images based on the mode parameters. When directions of the image acquisition units 120, 121, . . . , and 12n included in the imaging device 100 are perpendicular to the ground, the combination unit 130 generates a combination image by combining the frame images obtained from a first image acquisition unit and a second image acquisition unit that face each other. The combination unit 130 may determine positions of the frame images by using detection data obtained by the sensor included in the imaging device 100, may locate the frame images at the positions, and may generate a combination image by combining the frame images located at the positions.

When the image acquisition units 120, 121, . . . , and 12n included in the imaging device 100 are parallel to the ground, the combination unit 130 receives the frame images from all of the image acquisition units 120, 121, . . . , and 12n and generates a combination image by combining the frame images.

The combination unit 130 may further perform a process of processing the frame images in order to adjust resolutions of peripheral portions of the frame images. The combination unit 130 may further perform a process of straightening curved regions of the frame images captured with a fisheye lens and then may generate a combination image. The combination image may be a stereoscopic image observed by both eyes or a stereoscopic image observed from 360°. The combination unit 130 may generate a combination image having a three-dimensional (3D) effect by using the frame images that are two-dimensionally captured. The image acquisition unit 120 that is a first image acquisition unit and the image acquisition unit 121 that is a second acquisition unit may be physically spaced apart by a predetermined distance from each other. The frame images may be obtained by units that are physically separated from each other. A stereoscopic effect may be achieved by using the frame images. A detailed operation of the combination unit 130 will be explained below with reference to FIG. 4.

A second transmission unit 151 transmits the combination image to the processing device 200. The processing device 200 displays a converted combination image on an image output device such as a display connected to the processing device 100 or transmits the converted combination image to another device connected through the network.

According to the present embodiment, a combination image obtained by combining a plurality of frame images may include a stereoscopic effect.

An operation of the video processing apparatus 10 according to mode parameters will now be explained. The processing device 200 may include the image output unit 210, the communication unit 220, a parameter calculation unit 230, and a parameter transmission unit 240.

The image output unit 210 may output a combination unit obtained by using mode parameters.

The communication unit 220 may receive frame images and the combination unit from the imaging device 100.

The parameter calculation unit 230 calculates the mode parameters. The parameter calculation unit 230 calculates the mode parameters based on a user input that is input from a user or detection data that is received from the imaging device 100. The parameter calculation unit 230 determines the mode parameters according to a preset rule. The parameter calculation unit 230 determines the mode parameters corresponding to the input user input. The parameter calculation unit 230 determines the mode parameters corresponding to the received detection data.

The mode parameters may be related to whether an image acquisition unit is activated. That is, the imaging device 100 may operate in a binocular mode or a monocular eye mode according to activated unit information included in the mode parameters. The mode parameters may include information about whether a 360° effect is included.

The parameter transmission unit 240 transmits the determined mode parameters to the imaging device 100.

The mode setting unit 141 of the imaging device 100 receives the mode parameters. The mode setting unit 141 transmits the received mode parameters to a control information generating unit 140. The control information generating unit 140 may generate control information corresponding to the received mode parameters. The control information is used to determine an image acquisition unit group that is activated and an image acquisition unit group that is inactivated according to the activated unit information included in the mode parameters. The control information may be generated for an operation in a binocular mode or a monocular mode. The number of acquired images or an activated unit may be changed according to the control information. For example, in a binocular mode, images may be acquired from two or four image acquisition units. In a monocular mode, images may be acquired from one or two image acquisition units.

The control information may include information about a direction and a position of an image acquisition unit to be activated, according to the information about whether a 360° effect is included that is included in the mode parameters. In detail, the control information may include a code assigned to each image acquisition unit. The control information may include a code of an image acquisition unit to be activated.

Also, the control information may include information about the combination image to be generated by the combination unit 130. That is, the control information may include a syntax for controlling an operation of the combination unit 130.

The control information may be generated based on detection data corresponding to a current state received from the sensor unit 110.

The combination unit 130 may generate the combination image according to the mode parameters or the control information. The combination unit 130 may change the mode parameters according to a mode value received from the user and may generate the frame images as one combination image according to the changed mode parameters.

FIGS. 2 through 5 are flowcharts of an video processing method according to embodiments.

Figure 2:
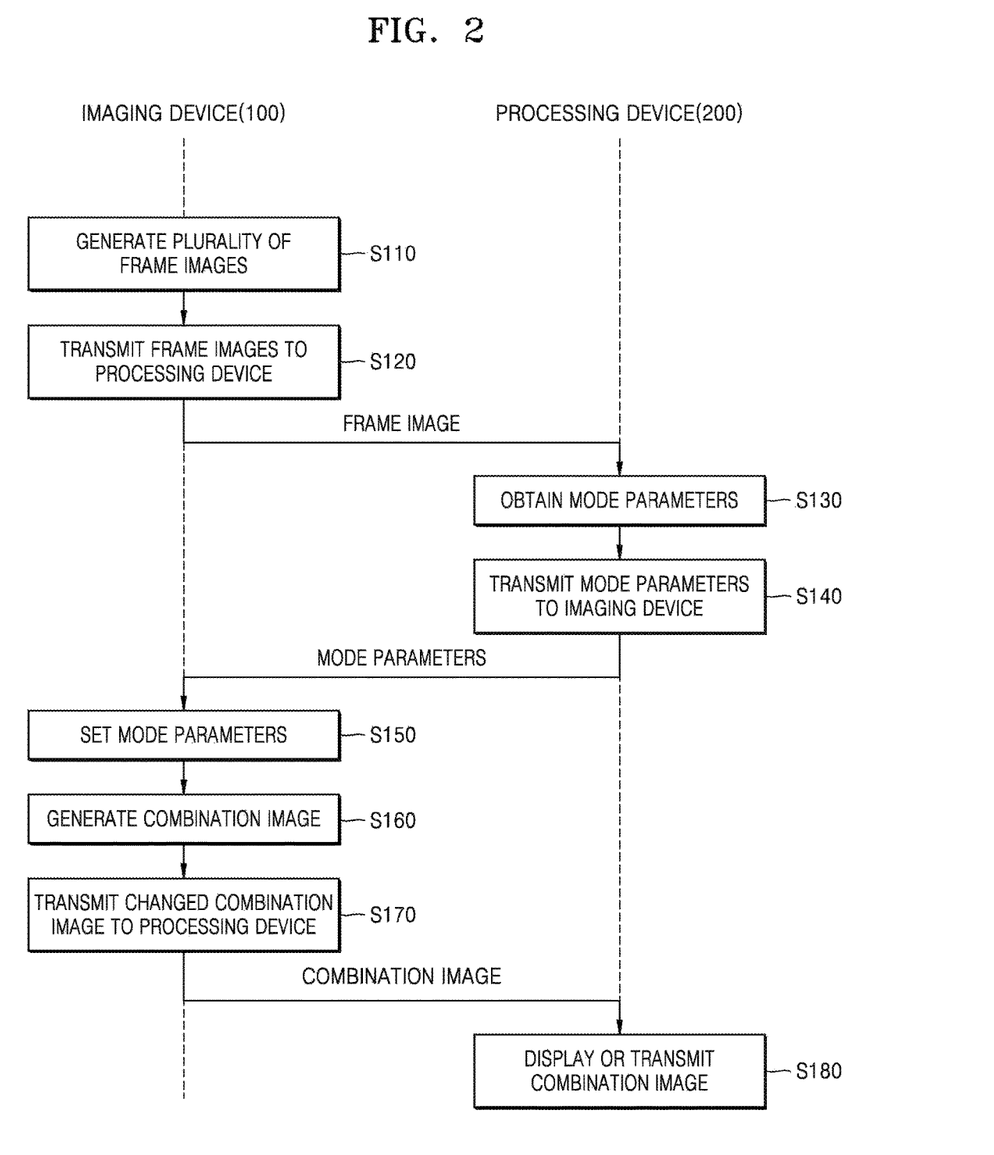
FIGS. 2 through 5 are flowcharts for explaining an operation of a video processing apparatus according to embodiments.

In operation S110, the imaging device 100 may generate a plurality of frame images. In operation S120, the imaging device 100 transmits the frame images to the processing device 200. In operation S130, the processing device 200 receiving the frame images obtains or generates mode parameters. The processing device 200 may obtain the mode parameters by using a user input receiving unit. The processing device 200 may generate the mode parameters based on the frame images. The processing device 200 may generate the mode parameters by using shapes of solid matters or people included in the frame images. In operation S140, the processing device 200 transmits the mode parameters to the imaging device 100.

In operation s150, the imaging device 100 sets the received mode parameters. Before setting the mode parameters, the imaging device may determine a validity of the mode parameters. The imaging device 100 may determine the validity by matching the mode parameters received from the processing device 200 to current detection data obtained by using the sensor unit 110. When it is determined that the mode parameters corresponding to the current detection data are not valid, the mode parameters may be changed.

In operation S160, the imaging device 100 generates a combination image in consideration of the mode parameters. All or some of the frame images may be used to generate the combination image. In accordance with the number of the frame images that are acquired, a channel through which the frame images are transmitted/received may be activated. For example, in a 3D mode, the imaging device 100 may generate the combination image by combining a first frame image and a second frame image acquired on the same plane or in the same direction. In a 360 mode, the imaging device 100 may generate the combination image by combining a first frame image and a third frame image captured in the opposite direction.

Also, a resolution of the combination image may vary according to each mode. When one frame image has a resolution of 4000×3000, the combination image may have a resolution exceeding the frame image. A resolution of the combination image increases to be a multiple of a resolution of the frame image due to the combination of the plurality of frame images. For example, the combination image may have a resolution of, for example, 8000×3000, 4000×6000, or 8000×6000. A process of generating the combination image may vary according to each mode.

In operation S170, the imaging device 100 transmits the combination image to the processing device 200.

In operation S180, the processing device 200 may display the received combination image or may transmit the received combination image to another output device. The processing device 200 may control the combination image having a stereoscopic effect to be displayed. The combination image generated according to each mode may be differently output.

Figure 3:
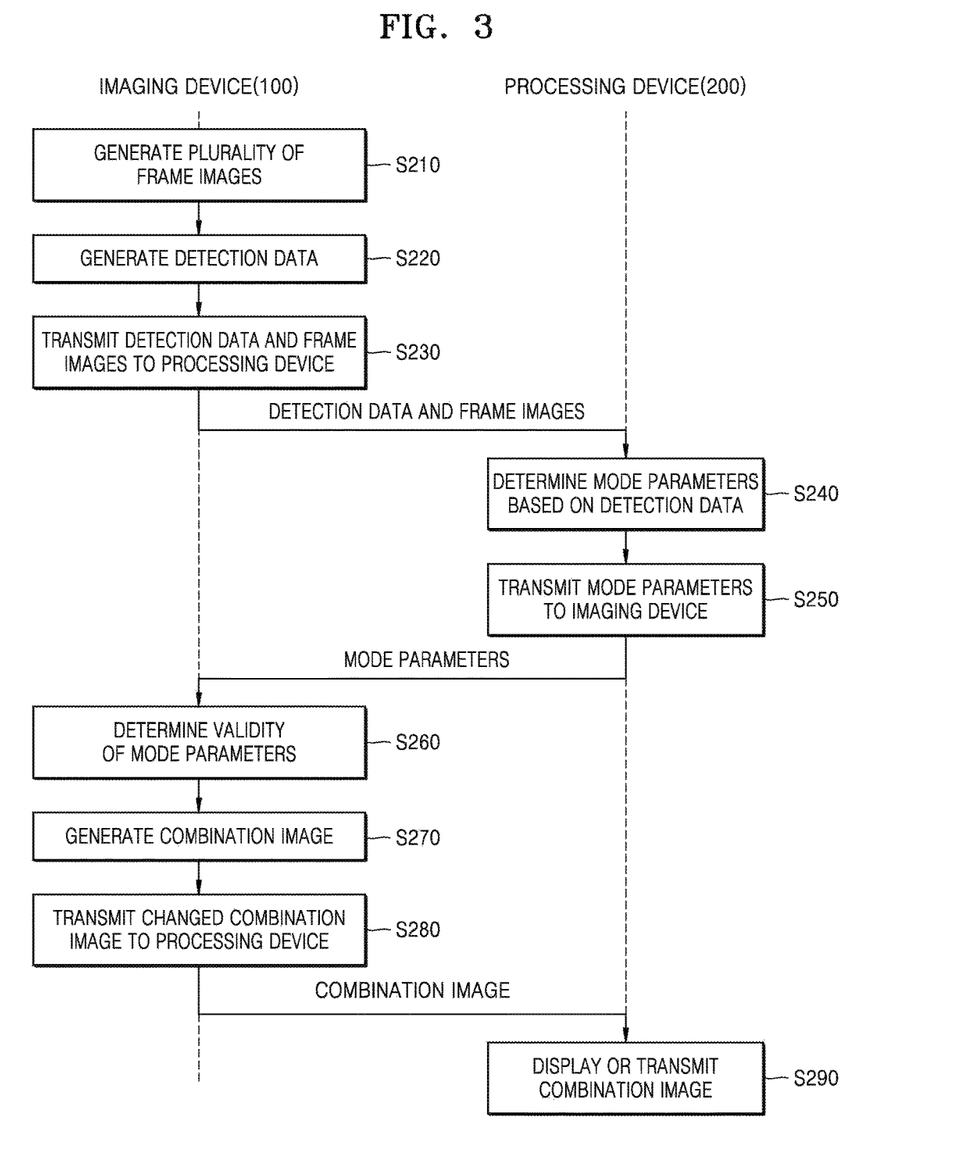

FIG. 3 is a flowchart of a video processing method of adjusting mode parameters by using detection data.

In operation S210, the imaging device 100 may generate a plurality of frame images. In operation S220, the imaging device 100 may generate detection data. The imaging device 100 may generate the detection data based on sensor values obtained by the sensor unit 110. The detection data may include information about whether a direction of the imaging device 100 is perpendicular or parallel to the ground. The detection data may include a luminance value. The luminance value may be obtained by a sensor provided in each image acquisition unit. By using a lookup table that is managed according to each sensor, a luminance value corresponding to a sensor value obtained by the sensor may be calculated. The imaging device 100 may determine an image processing method by using the luminance value obtained by using the detection data. A luminance of a frame image obtained from an image acquisition unit that is equal to or less than a preset reference luminance may be adjusted by an amount of change. The amount of change may vary in units of intervals of luminance values that change arithmetically. That is, a first amount of change may be applied to a luminance of a first range.

In operation S230, the imaging device 100 may transmit the detection data and the frame images to the processing device 200.

In operation S240, the processing device 240 may determine mode parameters based on the detection data. The mode parameters may be determined according to a direction of the imaging device 100 determined from the detection data. When the direction of the imaging device 100 is perpendicular to the ground, the mode parameters may be set to one of a 3D mode and a 3D 360 mode. When a plurality of modes are selected from the detection data, a user may be encouraged to select one mode. When the user does not select a mode even after a predetermined first period of time elapses, a mode in which a resolution of a combination image is the highest from among the modes selected from the detection data may be finally determined. According to the present embodiment, this is because when a mode with a higher resolution is selected, the mode may be changed to a mode with a lower resolution. The mode parameters may be related to a data format of an image. The mode parameters may be one of HD, SBS 3D, Anaglyph 3D, 360 degree, Anaglyph 360 degree, and 3D 360 degree.

In operation S250, the processing device 200 transmits the mode parameters to the imaging device 100.

In operation S260, the imaging device 100 determines a validity of the mode parameters. When a direction or an orientation of the imaging device 100 is changed after the mode parameters are determined by the processing device 200, the mode parameters may be re-changed. The mode parameters may be changed by reflecting a current state. In this case, the mode parameters set by an input of the user may not be changed.

In operation S270, the imaging device 100 generates a combination image based on the mode parameters.

In operation S280, the imaging device 100 transmits the combination image to the processing device 200.

In operation S290, the imaging device 100 displays or transmits the combination image.

Figure 4:
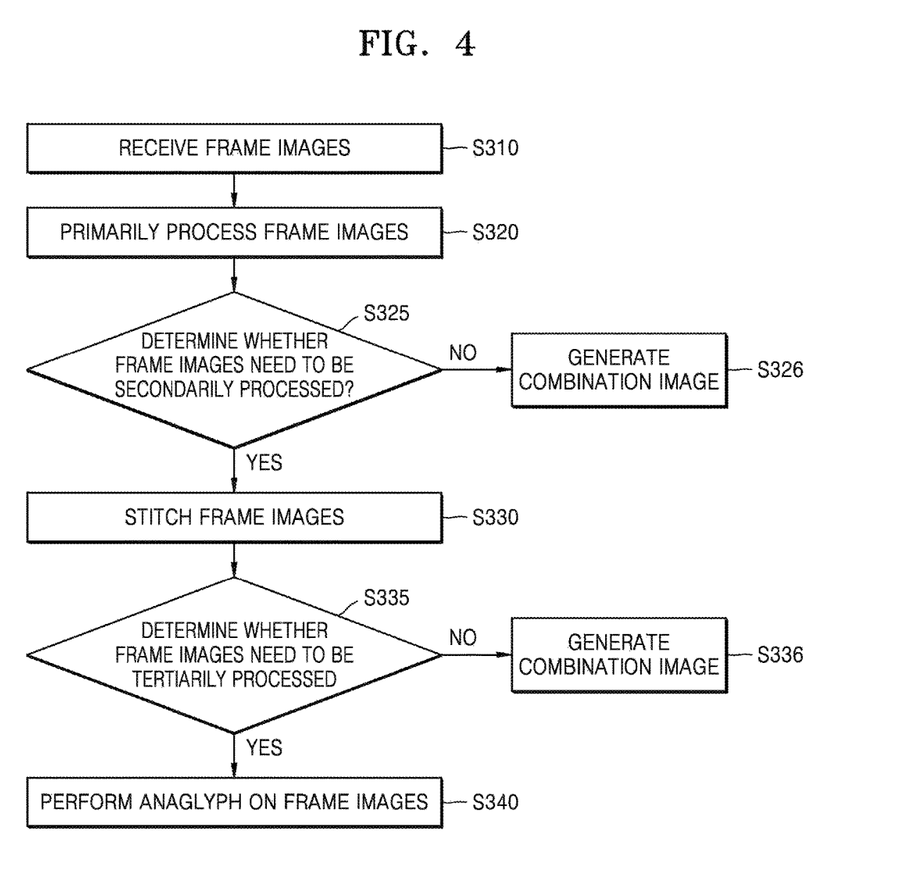
Figure 5:
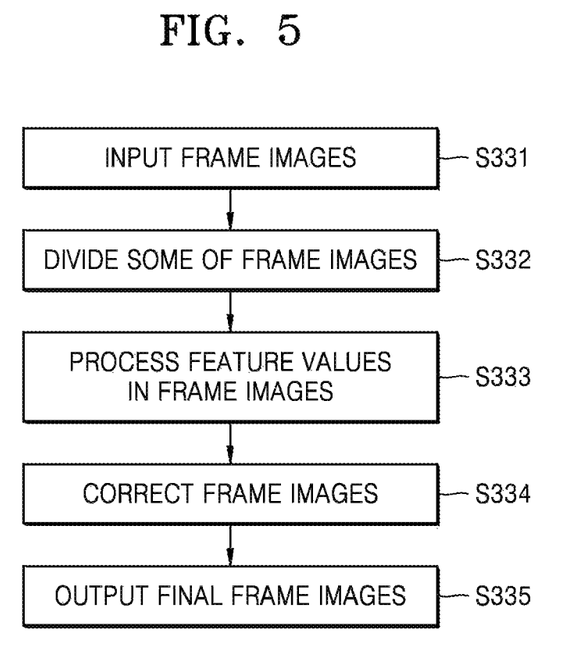

FIGS. 4 and 5 are flowcharts for explaining an operation of a combination unit.

In operation S310, a combination unit may receive frame images. The frame images may be obtained from a fisheye lens provided in an imaging device. The frame images obtained from the fisheye lens may be circular and distortion may increase away from the center. The combination unit may further perform a process of removing the distortion of the frame images. The distortion of the frame images tends to increase away from the center of the frame images.

In operation S320, the combination unit may primarily process the frame images. The combination unit may remove the distortion of the frame images. The combination unit may defish the frame images.

In operation S325, the combination unit may determine whether the frame images need to be secondarily processed. The combination unit may determine whether the frame images need to be secondarily processed based on mode parameters. When the mode parameters include a 360° effect, the combination unit may determine that the frame images need to be secondarily processed. When it is determined in operation S325 that the frame images do not need to be secondarily processed, the combination unit proceeds to operation S326. In operation S326, the combination unit may generate a combination image.

When it is determined in operation S325 that the frame images need to be secondarily processed, the combination unit proceeds to operation S330. In operation S330, the combination unit may stitch the frame images. The stitching refers to a process of combining the plurality of frame images and also a process for removing optical and/or geometric parameter differences between the frame images, which will be explained below in detail with reference to FIG. 5.

When the stitching is completed, in operation S335, the combination unit may determine whether the frame images need to be tertiarily processed. The combination unit may determine whether the frame images need to be tertiarily processed based on the mode parameters. The tertiary processing refers to anaglyph for producing a stereoscopic effect.

When it is determined in operation S335 that the frame images need to be tertiarily processed, the combination unit may proceed to operation S340. In operation S340, the combination unit may convert the frame images into a combination image based on the mode parameters. When the mode parameters include anaglyph conversion, the combination unit may perform anaglyph on a frame image captured from the left and a frame image captured from the right.

The mode parameters may include a plurality of parameters and may include a resolution of the combination image, information about whether a stereoscopic effect is included, a method of producing a stereoscopic effect, and information about whether a 360° effect is produced.

In an HD video, the combination unit may combine two frame images obtained by capturing an image from the left and the right without conversion. When a 360° effect or a VR effect is included, the combination unit may stitch frame images captured in a first direction and a second direction from the left. The combination unit may stitch a frame image obtained by capturing an image of a first side surface from the left and a frame image obtained by capturing an image of a second side surface from the left. In this case, the combination unit may divide one of the two frame images into two parts and may combine the two parts with another frame image. When a stereoscopic effect and anaglyph are included, the combination unit may generate a combination image by converting a frame image captured from the left and a frame image captured from the right and combining the converted frame images. When anaglyph and a 360° effect are included, the combination unit generates a first stitching image by stitching a frame image obtained by capturing an image of a first side surface from the left and a frame image obtained by capturing an image of a second side surface from the left and generates a second stitching image obtained by stitching a frame image obtained by capturing an image of the first side surface from the right and a frame image obtained by capturing an image of the second side surface from the right. The combination unit may generate a combination image by converting the first stitching image and the second stitching image.

A stitching process will now be explained.

In operation S331, a combination unit receives a plurality of frame images. In operation S332, the combination unit may divide some of the frame images into two images in order to generate an equirectangular format. In particular, the combination unit may divide a frame image of a back view into two parts in order to produce a stereoscopic effect or for combination with a frame image of a front view. The combination unit divides one frame image from among the frame images received from two image acquisition units into two parts and combines the parts with another frame image. In operation S333, the combination unit may process feature values included in the frame images. The combination unit may extract the feature values included in the frame images and may match corresponding feature values, which exist in different frame images, to each other. In this case, a method of extracting the feature values may use speeded up robust features (SURF) or an oriented FAST and rotated BRIEF (ORB) algorithm. The combination unit may arrange the frame images by using the corresponding feature values.

In more detail, the combination unit searches for the points corresponding to the points included in a first frame image obtained from a first image acquisition unit on second frame image obtained from a second image acquisition unit. A first pixel of the first frame image and a second pixel of the second frame image are arranged to correspond to each other. Next, overlapping pixels may be removed. For example, the combination unit may search the second frame for a pixel having a feature value similar to a feature value of a first point of the first frame image. In this case, a FLANN algorithm may be used to search for corresponding pixels. The feature value of the first point may be calculated by comparing a luminance value of the first point with luminance values of portions around the first point. For example, a luminance value difference between the luminance value of the first point and the luminance values of the portions around the first point may be considered. When the luminance value difference value is equal to or greater than a preset threshold value, the combination unit may detect the first point as a contour or a corner.

In another embodiment, the combination unit determines unique features in an input image. In more detail, the combination unit determines matching relationships between images processed by using an algorithm that is well known to one of ordinary skill in the art. The combination unit may match or associate objects included in the plurality of frame images by using the determined matching relationships. Even when some of pixels constituting the objects do not correspond, if the pixels equal to or greater a preset threshold ratio are matched, the combination unit may determine a matching relationship between the objects. The combination unit may determine that a first object included in the first frame image and a second object included in the second frame image correspond to each other based on the determined matching relationship.

In operation S334, the combination unit corrects the frame images. The combination unit may perform bundle adjustment for adjusting optical differences of lenses, surface wrap for converting the frame images acquired on a plane into spheres, exposure compensation for adjusting a luminance difference of the lenses, and blending for correcting geometric differences of the lenses. The bundle adjustment may be optional.

The combination unit may correct optical parameters, for example, parallax and/or a viewpoint difference, between the frame images acquired by a plurality of image acquisition units. The combination unit may perform the bundle adjustment based on rotation or focus parameters related to the rotation or focus of each frame image. All lenses physically rotate and have specific focus levels. That is, the frame images captured with the plurality of lenses may be synchronized through adjustment of the lenses based on the focus and rotation parameters.

The surface wrap may be performed only when a 360° effect is included. The surface wrap refers to a process of converting panoramic images obtained by adjusting geographic coordinates through the bundle adjustment into spheres.

Luminances of the frame images obtained according to gain parameters of the image acquisition units may be different from one another. The combination unit performs the exposure compensation in order to minimize a luminance difference. When there is no exposure difference, the blending may be more effective. The blending refers to a process of minimizing a luminance difference between overlapping pixels. The blending involves assigning more weights to pixels near the center of images. For example, pixels included in different frame images may have weights according to distances from the center of the images.

The combination unit may perform the above correction processes to minimize a luminance difference or a viewpoint difference between the frame images acquired from the plurality of image acquisition units.

In operation S335, the combination unit may form one combination image by matching objects included in the frame images and may remove unnatural representation occurring due to an optical or geometric parameter difference between pixels in the combination image.

Figure 6:
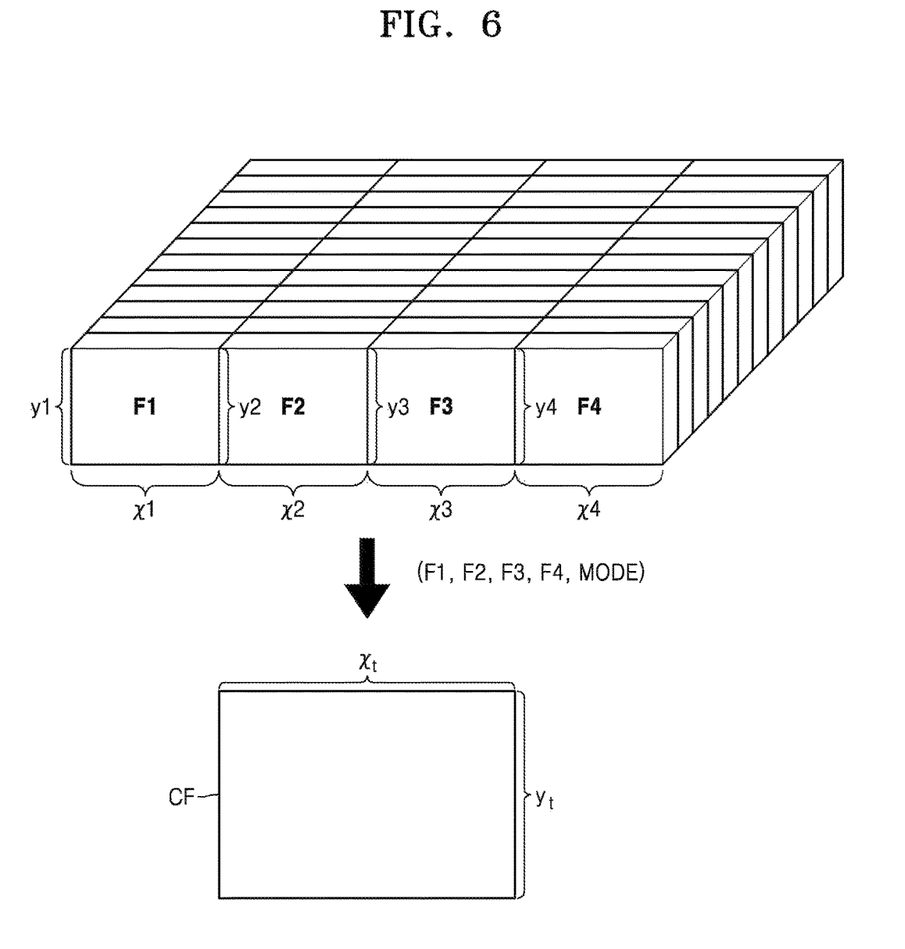
FIG. 6 is a view for explaining a relationship between a combination image and frame images.

As shown in FIG. 6, an imaging device may obtain four frame images F1, F2, F3, and F4 by using four image acquisition units. The frame images F1, F2, F3, and F4 may be acquired according to the number of frame images obtained per second that is preset. The combination unit may receive information about the frame images F1, F2, F3, and F4 and mode parameters MODE along with the frame images F1, F2, F3, and F4. The combination unit may determine a horizontal length $x_t$ and a vertical length $y_t$ of a combination image in consideration of horizontal lengths x1, x2, x3, and x4 and vertical lengths y1, y2, y3, and y4 of the frame images F1, F2, F3, and F4 and the mode parameters MODE. The horizontal length $x_t$ of the combination image may be a multiple of a smallest one from among the horizontal lengths x1, x2, x3, and x4 of the frame images F1, F2, F3, and F4. The vertical length $y_t$ of the combination image may be a multiple of a smallest one from among the vertical lengths y1 y2, y3, and y4 of the acquired frame images.

A video processing apparatus and method and a computer program for executing the video processing method according to the one or more embodiments may generate one combination image by combining a plurality of frame images.

Also, the video processing apparatus and method and the computer program for executing the video processing method according to the one or more embodiments may generate one combination image in consideration of mode parameters obtained for frame images.

The above-described device may be realized in the form of a hardware component, a software component, and/or a combination of a hardware component and a software component. For example, the device and corresponding components according to the above-described embodiments may be realized by using at least one or more universal computers or special-purpose computers, such as a processor, a controller, an arithmetic logic unit (ALU), a digital signal processor, a microcomputer, a field programmable array (FPA), a programmable logic unit (PLU), a microprocessor, or any type of device that can execute and respond to an instruction. A processing device may execute an operating system (OS) and one or more software applications, which are executed within the OS. Additionally, the processing device may respond to the execution of a software application, so as to access, store, manipulate, process, and generate data. In order to facilitate and simplify the understanding of the present disclosure, the present disclosure may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be possible herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the embodiment may be realized in a program command (or instruction) format that may be executed by using diverse computing means, so as to be recorded in a non-transitory computer-readable recording medium. Herein, the non-transitory computer-readable recording medium may independently include a program command (or instruction), a data file, a data structure, and so on, or may include a combination of the same. The program command being recorded in the medium may correspond to a program command that is specifically designed and configured for the embodiments, or the program command may correspond to a program command that is disclosed and available to anyone of ordinary skill in or related to computer software, Examples of the non-transitory computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of the program command may not only include machine language codes, which are created by a compiler, but may also include high-level language codes, which may be executed by a computer by using an interpreter, and so on. The above-mentioned hardware equipment may be configured to operate as one or more software modules for executing the operations of the embodiment, and vice versa.

It will be apparent to one of ordinary skill in the art that various modifications and variations can be made in the present disclosure without departing from the spirit or scope of the present disclosures. For example, the above-described techniques may be executed in an order different from that described in the description of the present disclosure, and/or the components of the above-described system, structure, equipment (or device), circuit, and so on, may be combined in a format different that of the above-described method according to the present disclosure, and an adequate result may be achieved even if the above-described components of the present disclosure are replaced by any other component or its equivalent.

Thus, it is intended that the present disclosure covers other realizations and other embodiments of this present disclosure provided they come within the scope of the appended claims and their equivalents.

What is claimed is:

1. A video processing apparatus comprising:
an imaging device; and
a processing device connected to the imaging device,
wherein the imaging device comprises a processor configured to:
generate a plurality of frame images and detection data obtained by a sensor, the detection data including information about a direction of the imaging device with respect to a ground;
transmit the plurality of frame images and the detection data to the processing device to determine mode parameters based on the detection data;
determine a validity of the mode parameter determined by the processing device, wherein when the direction of the imaging device is changed after the mode parameters are determined by the processing device, the mode parameters are changed by reflecting a current status;
generate a combination image by converting the plurality of frame images based on the mode parameters; and
transmit the combination image to the processing device.

2. The video processing apparatus of claim 1, wherein the processor is further configured to:
determine positions of the plurality of frame images by using detection data obtained by the sensor included in the imaging device,
locate the plurality of frame images at the positions, and
generate the combination image by combining the plurality of frame images located at the positions.

3. The video processing apparatus of claim 1, wherein the processor is further configured to:
change the mode parameters according to a mode value received from a user, and
generate the plurality of frame images as one combination image according to the changed mode parameters.

4. A video processing method of a video processing apparatus comprising an imaging device and a processing device connected to the imaging device that comprises a processor, the video processing method comprising:
generating, via the processor, a plurality of frame images and detection data obtained by a sensor, the detection data including information about a direction of the imaging device with respect to a ground;
transmitting, via the processor, the plurality of frame images and the detection data to the processing device to determine mode parameters based on the detection data;
determining, via the processor, a validity of the mode parameter determined by the processing device, wherein when the direction of the imaging device is changed after the mode parameters are determined by the processing device, the mode parameters are changed by reflecting a current status;
converting, via the processor, the plurality of frame images into one combination image by using the mode parameters to generate a combination image; and
transmitting, via the processor, the combination image to the processing device.

5. The video processing method of claim 4, wherein the converting of the plurality of frame images into the one combination image comprises:
determining positions of the plurality of frame images by using detection data obtained by the sensor included in the imaging device, locating the plurality of frame images at the positions, and generating the one combination image by combining the plurality of frame images located at the positions.

6. The video processing method of claim 4, wherein the converting of the plurality of frame images into the one combination image comprises:

changing the mode parameters according to a mode value received from a user, and generating the plurality of frame images as the one combination image according to the changed mode parameters.

7. A computer program stored in a non-transitory computer-readable storage medium to execute the video processing method of claim 4 by using a computer.

8. A computer program stored in a non-transitory computer-readable storage medium to execute the video processing method of claim 5 by using a computer.

9. A computer program stored in a non-transitory computer-readable storage medium to execute the video processing method of claim 6 by using a computer.

* * * * *